(12) United States Patent
Santos et al.

(10) Patent No.: US 12,499,148 B2
(45) Date of Patent: Dec. 16, 2025

(54) APPARATUS AND METHOD FOR PROVIDING TELECOMMUNICATION ROUTING DATA

(71) Applicant: NetNumber, Inc., Marlborough, MA (US)

(72) Inventors: Chuck Santos, Nashua, NH (US); Robbin W. Wells, Wrentham, MA (US)

(73) Assignee: NetNumber, Inc., Marlborough, MA (US)

( * ) Notice: Subject to any disclaimer, the term of this patent is extended or adjusted under 35 U.S.C. 154(b) by 362 days.

(21) Appl. No.: 18/314,969

(22) Filed: May 10, 2023

(65) Prior Publication Data

US 2024/0378231 A1    Nov. 14, 2024

(51) Int. Cl.
  *G06F 16/43*    (2019.01)
  *G06F 21/62*    (2013.01)
  *H04Q 3/00*    (2006.01)
  *H04Q 3/04*    (2006.01)
  *H04Q 3/66*    (2006.01)
(52) U.S. Cl.
  CPC .......... *G06F 16/43* (2019.01); *G06F 21/6218* (2013.01); *H04Q 3/002* (2013.01); *H04Q 3/04* (2013.01)

(58) Field of Classification Search
  CPC ....... G06F 16/43; G06F 21/6218; H04Q 3/04; H04Q 3/66
  USPC .... 379/220.01, 219, 221.01, 221.02, 221.04, 379/273, 274
  See application file for complete search history.

(56) References Cited

U.S. PATENT DOCUMENTS

2012/0265900 A1*  10/2012  Richardson ......... H04L 61/4511
                                                709/242

\* cited by examiner

*Primary Examiner* — Thjuan K Addy
(74) *Attorney, Agent, or Firm* — Sterne, Kessler, Goldstein & Fox

(57) ABSTRACT

Systems and methods are disclosed to provide routing data associated with a destination phone number to a service provider. The service provider sends a first query to a first computing node of a data provider for routing data associated with a phone number. The first computing node provides the routing data if it is available from the data provider. Otherwise, the first computing node identifies a second data provider that is capable of providing the routing data. The first computing node then obtains the routing data from the second data provider and returns it to the service provider.

21 Claims, 11 Drawing Sheets

600

Phone number: 19785551212

A first query: 2.1.2.1.5.5.5.8.7.9.1.e164.arpa.

A second query: 2.1.2.1.5.5.5.8.7.9.1.<identity of data provider>

*FIG. 6A*

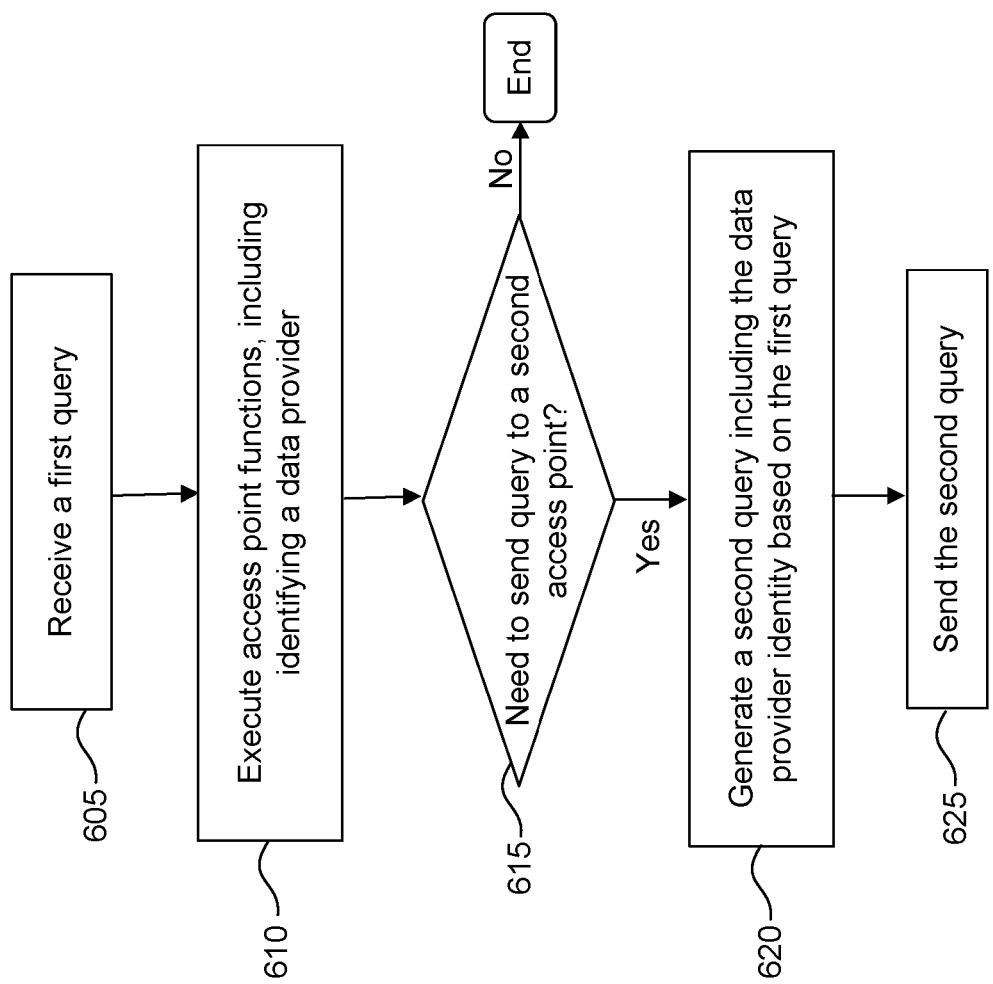

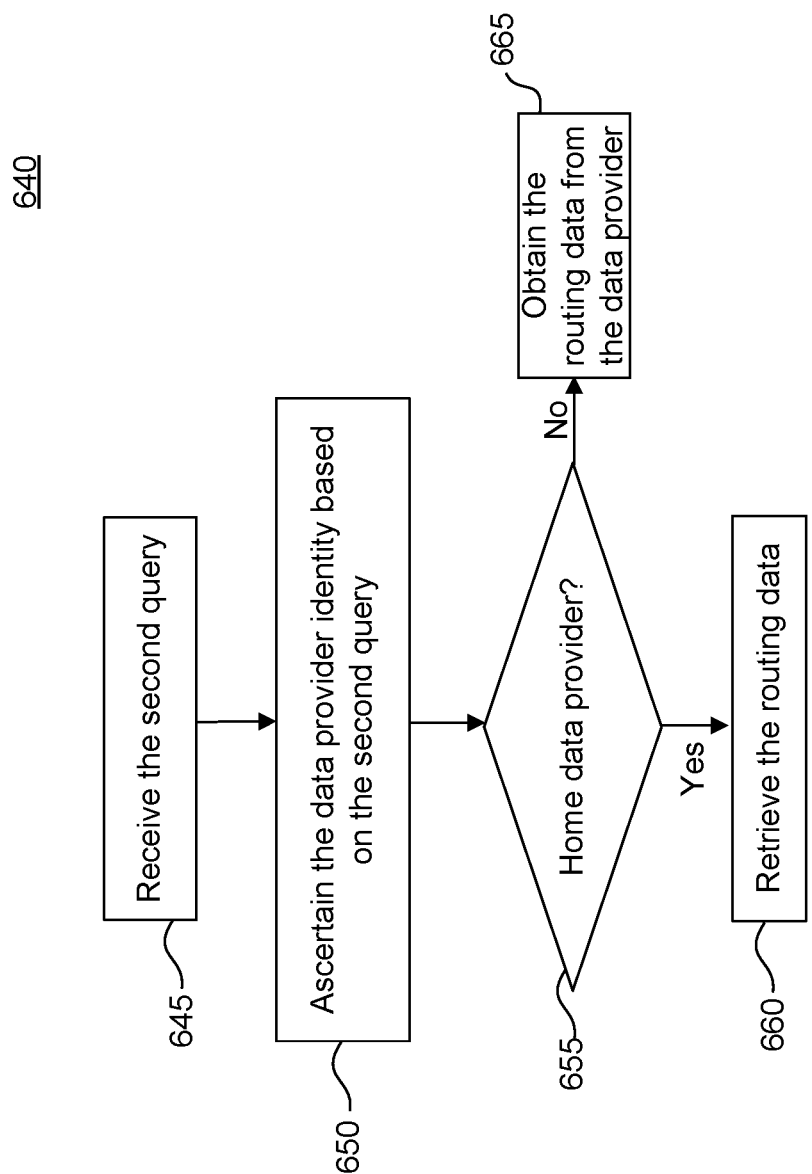

APPARATUS AND METHOD FOR PROVIDING TELECOMMUNICATION ROUTING DATA

BACKGROUND

Field

The described aspects generally relate to mechanisms for providing telecommunication routing data for telecommunication service providers.

Background

Telecommunication service providers may provide services such as audio/video calling, text messaging, video messaging, or the like to a destination phone number. Those service providers need to obtain routing information of the destination phone number to complete the service, for example, to connect audio/video calls, or to deliver messages. Service providers may obtain routing data of the destination phone number from various data providers by querying access points of those data providers. However, providing routing data access to service providers in a global scale may require distributing routing data to access points across the globe, which can be prohibitively expensive for data providers. Additionally, certain countries have regulatory requirements that restrict how such data can be accessed, which could further place burdens on service providers to establish and manage network connectivity to data providers.

SUMMARY

A cost effective way of providing routing data of phone numbers to service providers is provided. An efficient way of providing routing data with low latencies is also provided.

Some aspects of this disclosure relate to a computer-implemented method. Upon receiving a first query, by a first computing node, from a service provider for routing data associated with a phone number, and the first query comprises the phone number, the first computing node identifies a data provider that is capable of providing the routing data associated with the phone number and determines whether the routing data associated with the phone number is available to the first computing node. If the routing data is not available to the first computing node, the first computing node sends a second query to a second computing node, and the second query comprises the phone number. The routing data associated with the phone number is obtained.

In some aspects, when the first computing node receives the first query from the service provider, it identifies a destination country based on the phone number. The first computing node determines whether the service provider has authorization to access the routing data associated with the phone number from the destination country.

In some aspects, the second query sent by the first computing node comprises an identity of the data provider.

In some aspects, to obtain the routing data associated with the phone number, the routing data is retrieved from a data store associated with the second computing node. In some aspects, the routing data is retrieved from the data provider external to the second computing node.

In some aspects, the first query from the service provider to a firsts computing node and the second query from the first computing node to the second computing node use E.164 Number to Uniform Resource Identifier (URI) Mapping (ENUM) standard protocol, and the second query is a modified version of the first query.

In some aspects, to identify a data provider for routing data associated with the phone number, the data provider is chosen among a plurality of data providers capable of providing the routing data associated the phone number. In some aspects, choosing the data provider is based at least on one or more of data policy of the destination country, requirements of the data provider or cost of accessing the data provider.

Some aspects of this disclosure relate to a system. The system includes a memory, a processor coupled to the memory. The processor can be configured to receive a first query from a service provider. The first query comprises a phone number. The processor is further configured to identify a data provider capable of providing routing data associated with the phone number and determine whether the routing data associated with the phone number is available to a first computing node. The processor is further configured to send a second query to a second computing node in response to a determination that the routing data is not available to the first computing node. The second query comprises the phone number. The processor is further configured to obtain the routing data associated with the phone number.

In some aspects, the system further includes one or more data stores containing routing data associated with a plurality of phone numbers. In some aspects, the one or more data stores include a first data store and a second data store. The first data store is located at a different physical location from the second data store, and the first data store updates its data periodically from the second data store.

Some aspects of this disclosure relate to a non-transitory computer-readable medium having instructions stored thereon that, when executed by at least one computing processor, cause the at least one computing processor to perform operations of receiving a first query for routing data associated with a phone number from a service provider, and the first query comprises a phone number. The operations further include identifying a data provider capable of providing routing data associated with the phone number and determining whether the routing data associated with the phone number is available to a first computing node. The operations further include sending a second query to a second computing node in response to a determination that the routing data is not available to the first computing node and the second query comprises the phone number. The operations further include obtaining the routing data associated with the phone number.

Some aspects of this disclosure relate to a computer-implemented method. A first computing node receives a first query for routing data associated with a phone number from a service provider, and the first query comprises the phone number and uses a telecommunication number mapping protocol. The first computing node identifies a data provider capable of providing the routing data associated with the phone number and determines whether the routing data associated with the phone number is available to the first computing node. If it is determined that the routing data is not available to the first computing node, the first computing node generates a second query based on the first query by modifying a query suffix of the first query to include an identity of the data provider and sends the second query to a second computing node in response. Finally, the first computing node obtains the routing data associated with the phone number.

This Summary is provided for purposes of illustrating some aspects of the disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 6A illustrates an example of a first query and a second query based on ENUM protocol, according to some aspects of the disclosure.

FIG. 6B illustrates an example method performed by a computing node generating a second query based on a first query, according to some aspects of the disclosure.

FIG. 6C illustrates an example method performed by a computing node after receiving a second query, according to some aspects of the disclosure.

Figure 1A:
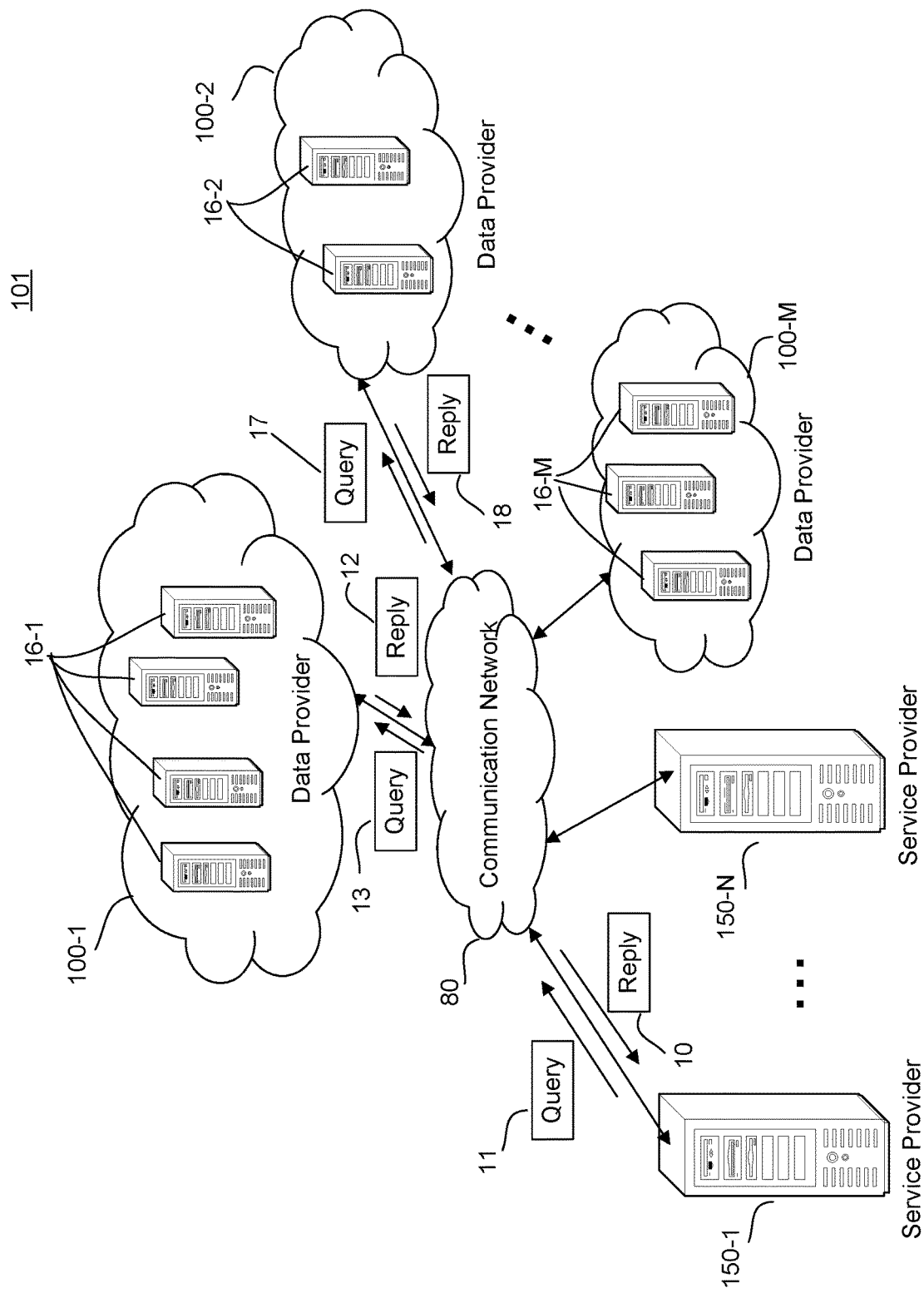
FIG. 1A illustrates an exemplary system in which service providers obtain routing data from data providers, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1A illustrates an exemplary system 101 according to some aspects of the disclosure. In some aspects, system 101 includes one or more data providers 100-1 to 100-$m$ coupled to one more service providers 150-1 to 150-N via a network 80, e.g., a communications network, where M and N are integer values. From here on, service providers 150-1, ..., 150-N are either referred to as a group as service provider 150 or individually as service provider 150-1, 150-2, ..., 150-N. Similarly, data providers 100-1, 100-2, ..., 100-M are referred to either as a group as data provider 100 or individually as data provider 100-1-1, 100-2, ..., 100-M. In one aspect, each of the data providers 100 may include one or more servers, e.g., 100-1 can contain one or more servers 16-1, 100-M can contain one or more servers 16-M, etc. In one aspect, service providers 150-1 obtain routing data from one or more data providers 100-1, 100-2, ..., 100-M.

According to some aspects, service provider 150-1 may provide audio/video calling and messaging services based on telephone numbers. Messages may be any media, including but not limit to text, audio, or video. Service provider 150-1 can be a telecommunication carrier such as Verizon, AT&T™, T-Mobile™, Vodafone™, or the like. Service provider 150-1 can also be social media platforms such as WhatsApp™, TikTok™, SnapChat™, or the like. However, the aspects of this disclosure are not limited to these examples and service provider 150 can be any provider that provides services based on phone numbers. To complete the service to a target phone number, service provider 150-1 obtain the routing data of the target phone number in order to route data to the correct destination phone number. In some aspects, the routing data includes necessary information for the service provider to reach the destination phone number. For example, the routing data may include carrier information of the destination phone number, the service provider for the destination number. The routing data may also include message provider's information for a message to the destination phone number. It is desirable to obtain the routing data accurately and with low latency.

Data provider 100-1100-2 may communicate with each other, and servers 16-1 in data provider 100-1 may communicate with each other or with other servers of another data provider, for example, servers 16-2 of data provider 100-2. Additionally, service provider 150 can communicate with one or more data provider 100. All the communication are enabled by communication network 80.

According to some aspects, communication network 80 may be wired or wireless communication networks or a combination of both wired and wireless communication networks. Communication network 80 may include Internet Protocol (IP) based networks, such as the Internet. Communication network 80 may be part of public and/or private networks and it may include an intranet, a local area network (LAN), a wide area network (WAN), or one or more access networks, such as, for example, Radio Access Networks (RANs) of one or more wireless communication systems. Wireless communication systems may include systems standardized by the 3$^{rd}$ Generation Partnership Project (3GPP) or by the Institute of Electrical and Electronics Engineers (IEEE), such as, for example, Long Term Evolution (LTE), LTE-Advance (LTE-A), 5G New Radio, or IEEE 802.11. Wireless communication systems may also include satellite based networks.

According to some aspects, service provider 150-1 sends query 11 including a destination phone number to data provider 100-1. Query 11 may also include other information such as types of service the destination phone number is associated with, for example, voice service, messaging service, etc. Service provider 150-1 may choose data provider 100-1 based on the destination phone number. For example, service provider 150-1 may determine the destination country of the phone number and choose data provider 100-1 that is most likely to provide routing data associated with the phone number of the destination country. Alternatively, data provider 100-1 may be close to service provider 150-1, and service provider 150-1 sends query 11 to data provider 100-1 to obtain the routing data associated with the phone number.

In some examples, data provider 100-1 is deemed to be close to service provider 150-1 if they are in physical proximity, for example, one of the access points of data provider 100-1 is located in the same city as service provider 150-1, or within certain distance of service provider 150-1. Alternatively or additionally, data provider 100-1 is deemed to be close to service provider 150-1 if accessing data provider 100-1 is possible with low latency, for example, there is a dedicated communication link between service provider 150-1 and data provider 100-1, for example, a direct connection through a data center, or there are few hops in communication network 80 to data provider 100-1 by service provider 150-1. However, the aspects of this disclosure are not limited to these examples and other criteria can be used for determining that data provider 100-1 is close to service provider 150-1 Data provider 100-1 receives query 13 after query 11 is transmitted through the communication network 80. The format or content of query 11 may be different from query 13. However, it is to be appreciated that query 13 and query 11 may be the same.

According to some aspects, data provider 100-1 may include one or more servers 16-1. Servers 16-1 can include computing nodes that are interconnected to each other through a data provider 100-1 network. Servers 16-1 may be distributed throughout the network. Servers 16-1 may be virtual instances in a cloud computing environment by one or more of the cloud service providers such as AWS™, Microsoft Azure™, or Google Cloud Platform™. Servers 16-1 may be combinations of software and hardware resources in a cloud computing environment. Additionally, or alternatively, servers 16-1 may be a in a mixed computing environment with a combination of public clouds and private clouds. Accordingly, data provider 100-1 network may be a virtual network in a cloud computing environment. Additionally or alternatively, data provider 100-1 may be a private network or a combination of public/private networks.

In some aspects, servers 16-1 may provide capabilities such as, but not limited to, authentication and routing. Servers 16-1 may contain data stores that store routing data associated with phone numbers. It is to be appreciated that what is described here is only one implementation, which does not limit the scope of the disclosure. It is to be appreciated that data provider 100-1 is used as an example for discussion. Data providers 100-2, . . . , 100M may or may not be implemented the same way as data provider 100-1.

According to some aspects, data provider 100-1 receives query 13 for routing data associated with a phone number from service provider 150-1, and query 13 includes the phone number. Query 13 may also include other information such as types of service the destination phone number is associated with, for example, voice service, messaging service, etc. Data provider 100-1 may determine the identity of service provider 150-1, the destination country based on the phone number, and/or whether service provider 150-1 has the authentication to access routing data of the destination country. If service provider 150-1 does not have the authentication to access the routing data of the destination country, data provider 100-1 may return reply 12, and the reply 12 may include an error message to service provider 150-1. Subsequently, service provider 150-1 may receive the error message in reply 10. Data provider 100-1 may determine whether it has the routing data available. According to some examples, routing data is deemed available in data provider 100-1 if the routing data is stored in one of the servers 16-1 of data provider 100-1. If it is determined that data provider 100-1 has the routing data that service provider 150-1 is requesting, the routing data may be retrieved by data provider 100-1 from one of its servers 16-1 and returned to service provider 150-1 through reply 12. Subsequently, service provider 150-1 may receive the routing data through reply 10. Reply 12 becomes reply 10 after being transmitted through communication network 80. The format of reply 12 may be different from reply 10. However, it is to be appreciated that reply 12 and reply 10 may be the same.

In some aspects, one or more servers 16-1 of data provider 100-1 may contain data stores that store routing data associated with phone numbers. Each data store may contain routing data associated with a plurality of phone numbers, for example, one data store may contain routing data associated with part or all phone numbers of a country. Another data store may contain routing data associated with the same or different phone numbers. There may be partial overlap of routing data between two or more data stores. Servers 16-1 that contain data stores may be strategically located in data provider 100-1 network. Not all servers 16-1 may contain data stores. Data stores having overlapping routing data may synchronize with each other periodically, and/or when changes to data happen in one of the data stores. For example, a data store located in North America may have routing data associated with part or all phone numbers of US, a data store located in Europe may also have routing data associated with the same set of phone numbers of US. Data store located in Europe obtains and updates the routing data from the data store located in North America. The update may occur periodically and/or when routing data in the data store located in North American changes. There may be many reasons to duplicate routing data associated with U.S. phone numbers from a data store located in U.S. to a data store located in Europe. One reason may be that many service provider requests for routing data associated with U.S. phone numbers are originated in Europe, and it would be efficient for such routing data to be accessible in a store located in Europe. It is to be appreciated that what is described here is only one exemplary implementation, the description here does not preclude other implementations.

In some aspects, data provider 100-1 may not have the routing data that service provider 150-1 is requesting. Data provider 100-1 can identify a different data provider 100-2 that is capable of providing the routing data associated with the phone number. There may be more than one data providers that are capable of providing the routing data that service provider 150-1 is requesting. A set of criteria may be used to identify data provider 100-2. In some aspects, the set of criteria may include data policy of the destination country. For example, the destination country may not allow routing data of phone numbers to be stored and accessed outside the country. In this case, only data provider 100-2 that have server(s) 16-2 located in that country is allowed to store the routing data and provide access to the routing data. In some aspects, the set of criteria may include analyzing requirements of data provider 100-2. For example, data provider 100-2 may impose data use requirements that may or may not be compatible with the service provider 150-1's intended use. In some aspects, the set of criteria may include the cost of accessing data provider 100-2. Different data providers may charge different fees of accessing their routing data. Other criteria such as the latency of accessing data provider 100-2, or the underline network condition to data provider 100-2 may also be used in choosing data provider 100-2. It is to be appreciated that the criteria of choosing data provider 100-2 discussed here are not exclusive, other criteria may be used in combination or in additional to the criteria described here.

In some aspects, once data provider 100-1 identifies a different data provider 100-2 that has the capability of providing routing data associated with the destination phone number requested by service provider 150-1, data provider 100-1 may send query 17 to data provider 100-2 for the routing data. Data provider 100-1 can choose a desired route to reach data provider 100-2 and obtain the routing data through reply 18. Data provider 100-1 may return the routing data to service provider 150-1 in reply 12. Subsequently, service provider 150-1 may receive routing data in reply 10. Reply 18 may become reply 12, and reply 12 may become reply 10, after being transmitted through communication network 80. The format of reply 12 may be different from reply 17. However, it is to be appreciated that reply 12 and reply 17 may be the same. Similarly, the format of reply 10 may be different from reply 12. However, it is to be appreciated that reply 10 and reply 12 may be the same.

Figure 1B:
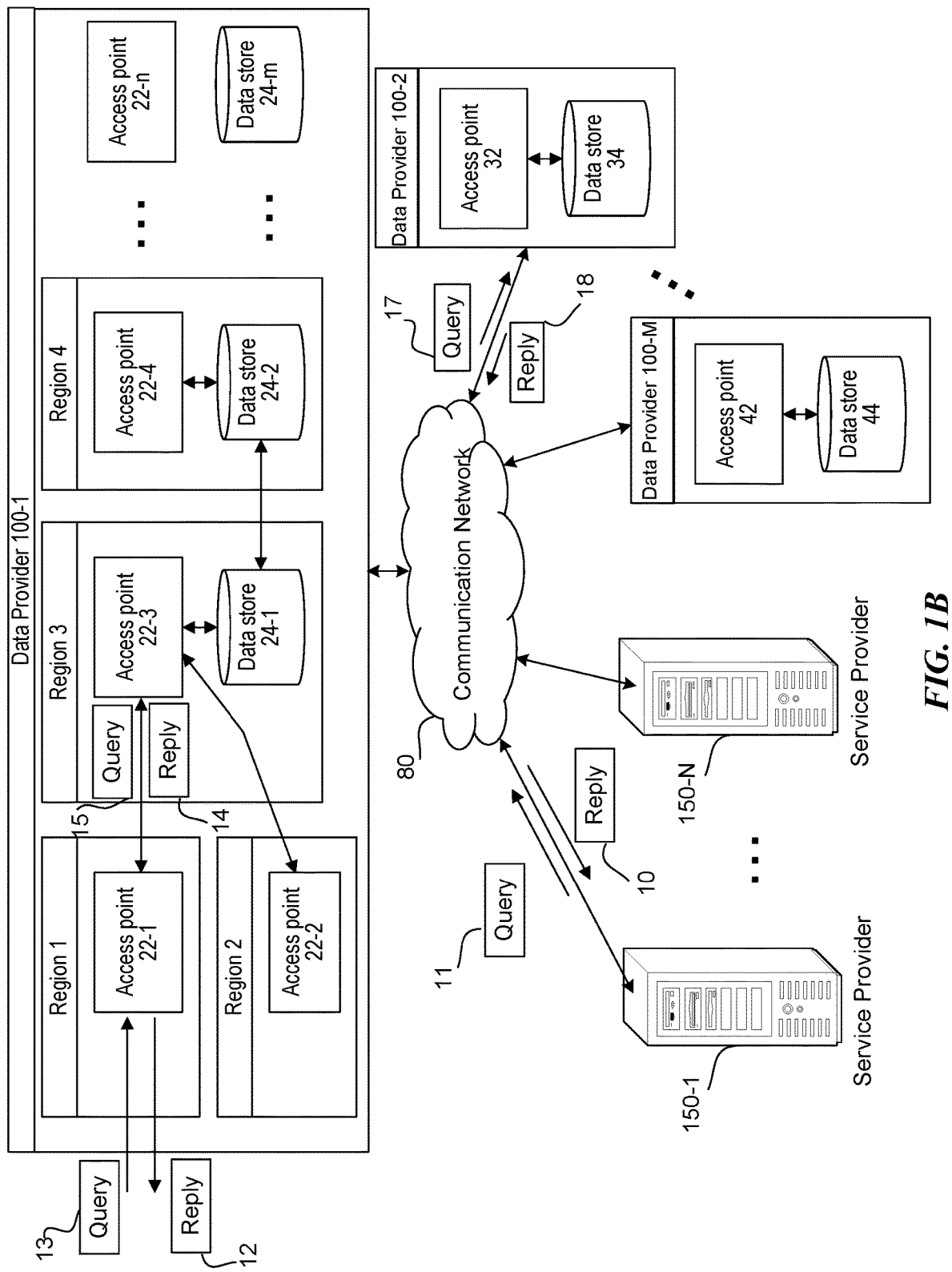
FIG. 1B illustrates an example data provider implementation to provide routing data to service providers, according to some aspects of the disclosure.

FIG. 1B illustrates an example data provider 100-1 implementation to provide routing data to service provider 150-1, according to some aspects of the disclosure. Example data provider 100-1 implementation is provided for the purpose of illustration only and does not limit the disclosed aspects. Data provider 100-1 provides routing data associated with phone numbers to service provider 150-1. As a convenience and not a limitation, FIG. 1B may be described with regard to elements of FIG. 1A.

In one aspect, data provider 100-1 may include interconnected computing nodes such as access points 22-1, 22-2, . . . , 22-n and data stores 24-1, 24-2, . . . , 24-m, where n and m are integer values From here on, access points 22-1, 22-2, . . . , 22-n are either referred to as a group as access point 22 or individually as access point 22-1, 22-2, . . . , 22-n. Similarly, data stores 24-1, 24-2, . . . , 24-m are either referred to as a group as data store 24 or individually as data store 24-1, 24-2, . . . , 24-m. Access point 22 and data store 24 may be implemented by server(s) 16-1 of FIG. 1A. One server 16-1 of FIG. 1A may host one or more access points. Additionally, or alternatively, one access point may be implemented by more than one server 16-1 of FIG. 1A. Similarly, one server 16-1 of FIG. 1A may host one or more data stores. Additionally, or alternatively, one data store may be implemented by more than one server 16-1 of FIG. 1A. In one implementation, server 16-1 of FIG. 1A may host both access points and data stores. For example, access point 22-3 and data store 24-1 are hosted by one server 16-1 of FIG. 1A. Data store 24-1 may be implemented in a distributed fashion or in a centralized fashion. It is to be appreciated that other implementation of data store 24-1 is possible.

In some aspects, computing nodes of data provider 100-1, such as access point 22 and data store 24, are interconnected by data provider 100-1 network, which enables data provider 100-1 to control latency and find desired routes for transmissions between different computing nodes within data provider 100-1 network. Data provider 100-1 network may cover different Regions by deploying access point 22 and/or data store 24 in one or more regions. Each Region may represent one or more countries. For example, Region 1 may represent all or part of South East Asia, Region 2 may represent all or part of Africa, Region 3 may represent all or part of South Europe and Region 4 may represent all or part of North America. While FIG. 1B illustrates four Regions in data provider 100-1 network, it is to be appreciated that data provider 100-1 network may include more than four Regions, or less than four Regions. It is also to be appreciated that while in FIG. 1, each Region has one access point, there may be more than one access points in one Region. Similarly, some Regions may have one or more data stores, while other Regions may have no data store.

In some aspects, access point 22-1 may be deployed in places that are close to service provider 150-1. This way, the latency between service provider 150-1 and data provider 100-1 may be low. An access point 22-1 is said to be close to service provider 150-1 if they are located in physical proximity, for example, they may be located in the same city, within certain distance or in the same data center. An access point 22-1 is also close to service provider 150-1 if the latency between access point 22-1 and service provider 150-1 is low. For example, if there is a dedicated communication line between access point 22-1 and service provider 150-1, or if there are few hops in communication network 80 from service provider 150-1 to access point 22-1. However, the aspects of this disclosure are not limited to these examples and other criteria can be used for determining that access point 22-1 is close to service provider 150-1. There may be more than one access point that is close to service provider 150-1. Service provider 150-1 may choose one of the access points that provides lower latency at the time of requesting routing data. If there is no access point located at the same Region as service provider 150-1, service provider 150-1 may send query seeking routing data to an access point that is located at a different Region.

In some aspects, data stores 24 may be placed in selected Regions and are associated with a subset of access point 22. It may be desirable to have the number of data stores 24 to be less than the number of access points 22 in data provider 100-1 network, according to some aspects. Typically, more access points 22 are needed to provide access of data provider 100-1 to service providers 150, and limiting the number of data stores 24 may reduce the cost of maintaining routing data across data store 24, according to some aspects. For example, data store 24-1 may be deployed in Region 3 and it is associated with access point 24c. And no data store is deployed in Region 1 or Region 2. Data store 24-1 is said to be associated with access point 22-3 if access point 22-3 can access data store 24-1 directly, according to some aspects. This may be implemented by co-locating access point 22-3 and data store 24-1 in the same server 16-1 of FIG. 1A. If access point 22-3 and data store 24-1 are hosted by different server 16-1 of FIG. 1A, access point 22-3 may still have direct access to data store 24-1 without going through another access point so that data store 24-1 is deemed as being associated with access point 22-3.

In some aspects, each data store 24-1, . . . , 24-m may contain routing data associated with a plurality of phone numbers. For example, data store 24-2 may contain routing data associated with part or all phone numbers of U.S. Data store 24-1 may contain routing data associated with the same set of phone numbers of U.S. as in data store 24-2. Additionally, or alternatively, data store 24-1 may contain routing data associated with phone numbers of countries in Region 3, such as Germany. Data store 24-1 may update its routing data associated with U.S. phone numbers by synchronizing with data store 24-2 periodically, and/or when changes of routing data occur to data store 24-2. In this implementation, data store 24-1, . . . , 24-m are located in selected regions within the data provider 100-1 network. How to selectively deploy data store 24 within the data provider 100-1 network may depend on various factors. One factor may be the overall cost of maintaining data store 24 in data provider 100-1 network. Another factor may be the performance of providing routing data to service provider 150. Another factor may be the frequency and likelihood of certain routing data to be requested by service provider 150. In one example, certain Region may have more requests for routing data associated with phone numbers. Therefore, one or more data stores may be deployed in this Region to meet the demands. In another example, routing data associated with U.S. phone numbers may be duplicated from a data store 24-2 located in Region 4 (for example, North America) to data store 24-1 located in Region 3 (for example, South Europe). One reason may be that many service provider requests for routing data associated with U.S. phone numbers are originated in Region 3, and it would be more efficient for such routing data to be accessible in a store located in Region 3. However, the aspects of this disclosure are not limited to these examples and other criteria can be used to deploy data stores 24 in data provider 100-1 network. It is to be appreciated that what is described here is only one exemplary implementation, the description here does not preclude other implementations.

In some aspects, access point 22-1 may provide an initial interface between service provider 150-1 and data provider 100-1. Access point 22-1 may act as a gatekeeper for data provider 100-1 by performing certain functionalities. If service provider 150-1 tries to send messages to a destination using a destination phone number, service provider 150-1 may send query 11 to data provider 100-1 to obtain routing data associated with the destination phone number so that it may route the messages to the destination based on the phone number. Query 11 may include the destination phone number. When query 11 is transmitted through communication network 80, it may turn into query 13. It is to be appreciated that query 13 may or may not be the same as query 11. However, query 13 may also include the destination phone number. When access point 22-1 receives query 13 for routing data associated with the destination phone number, it may make several determinations, such as, for example, the identity of service provider 150-1, destination country that routing data is being requested based on the destination phone number, whether service provider 150-1 is authorized for accessing the routing data of the destination country, who is the data provider that is capable of providing routing data associated with the phone number, etc.

If the routing data associated with the destination phone number is located at a data store associated with access point 22-1, access point 22-1 may retrieve the routing data and reply back to service provider 150-1 in reply 12. If the routing data associated with the destination phone number is not located at a data store associated with access point 22-1, or no data store is associated with access point 22-1, access point 22-1 may identify an identity of a data provider that is capable of providing the requested routing data. If the identified data provider is the home data provider, e.g., data provider 100-1 that access point 22-1 belongs to, access point 22-1 may know that the routing data can be obtained internally in data provider 100-1 network. In one implementation, access point 22-1 may have information about routing data of all data stores 24 in data provider 100-1, and their associated access points 22. Such information may be stored in a database in access point 22-1. The database may have records of countries, and/or range of phone numbers with which each data stores 24 has the routing data associated. Based on the destination country and/or the phone number, access point 22-1 may identify data store 24-1 that has routing data associated with the destination phone number, and access point 22-3 that has direct access to data store 24-1. Subsequently, access point 22-1 may send query 15 to access point 22-3.

If the identified data provider is not the home data provider 100-1, e.g., data provider 100-2 which is external to data provider 100-1 network, the routing data is not available internally in the home data provider 100-1 network. In one implementation, access point 22-1 may know how to access the external data provider directly. For example, access point 22-1 may have routing table to external data providers. In this case, access point 22-1 may obtain the routing data directly from the external data provider. If access point 22-1 cannot access the external data provider directly, access point 22-1 may have information about which access point is capable of accessing the external data provider. Such information may be stored in a database in access point 22-1. The database may have records of all external data providers and corresponding access points 22 that are capable of accessing external data providers. In one example, based on the identity of the identified data provider, access point 22-1 may identify access point 22-3 as being capable of accessing data provider 100-2. Subsequently, access point 22-1 may send query 15 to access point 22-3.

In one implementation, query 15 may include the destination phone number. After receiving query 15, access point 22-3 may perform similar gatekeeping functionalities and make similar determinations as access point 22-1. For example, access point 22-3 may identify the identity of service provider 150-1, destination country that routing data is being requested based on the destination phone number, whether service provider 150-1 is authorized for accessing the routing data of the destination country, the identity of a data provider capable of providing routing data associated with the phone number, etc. Once the identity of the data provider capable of providing routing data is identified, access point 22-3 may further determine whether data is available internally and how to access the data, and if data is available in an external data provider, how to access the external data provider, etc. However, access point 22-3 may not need to perform all the functionalities. In one implementation, access point 22-3 may know that query 15 is sent internally from another access point 22-1. Based on sender's identity, access point 22-3 may not need to determine the identity of service provider 150-1 or whether service provider 150-1 is authorized to access routing data of the destination country.

In another implementation, query 15 may include the identity of the data provider identified by access point 22-1. In this case, it may not be necessary for access point 22-3 to perform the determination of the identity of a data provider capable of providing the requested routing data. Instead, access point 22-3 may read query 15 and obtain the identity of the data provider. If the identity of data provider is for data provider 100-1, and data store 24-1 that is associated with access point 22-3 has the requested routing data, access point 22-3 may retrieve the routing data from data store 24-1. If data store 24-1 does not have the routing data available, access point 22-3 may send a request to the next access point for the routing data. If the identity of data provider is for data provider 100-2, which is external to data provider 100-1 network, access point 22-3 may send query 17 to data provider 100-2 and obtain routing data from data provider 100-2 in reply 18. Once obtained the requested routing data, access point 22-3 may then response back to access point 22-1 in reply 14 that includes the routing data. Access point 22-1 may transmit the routing data back to service provider 150-1 in reply 12. Subsequently, service provider 150-1 may receive the routing data in reply 10. Reply 14 may become reply 10 after being transmitted through data provider 100-1 network and communication network 80. It is to be appreciated that reply 10, reply 12 and reply 14 may or may not be the same.

In some aspects, access point 22-1 and/or access point 22-3 may identify that data provider 100-2 is capable of providing routing data associated with the destination phone number. There can be more than one data providers that are capable of providing routing data that service provider 150-1 is requesting. A set of criteria may be used to identify data provider 100-2. In some aspects, the set of criteria may include data policy of the destination country. The destination country may not allow routing data associated with phone numbers of the country to be stored and accessed outside of the country. For example, the destination country is United Kingdom, and United Kingdom requires that all routing data associated with phone numbers of the United Kingdom have to be stored and accessed within the boundary of the United Kingdom. Therefore, only data provider, for example, data provider 100-2, that has access point 32 and data store 34 located in the United Kingdom is allowed to store the routing data and provide access to the routing data. In some aspects, the set of criteria may include analyzing requirements of data provider 100-2. For example, data providers 100 may impose data use requirements that may or may not be compatible with service provider 150-1's intended use. According to some aspects, only data provider 100-2 that has data use requirements that are compatible with service provider 150-1's intended use may be possible to provide routing data to service provider 150-1. In some aspects, the set of criteria may include the cost of accessing data provider 100. Different data providers 100 may charge different fees of using their routing data. Other criteria such as the latency of accessing data provider 100-2, or the underline network condition to data provider 100-2, may be used in choosing data provider 100-2. It is to be appreciated that the criteria of choosing data provider 100-2 discussed here are not exclusive, other criteria may be used in combination or in additional to the criteria described here.

In some aspects, each of access point 22-1, 22-2, ..., 22-n is capable of performing a set of functionalities, such as, for example but not limited to, determining the destination country that routing data is being request based on a phone number included in an incoming query, for example, query 13 and/or query 15, whether service provider 150-1 is authorized for the routing data of the destination country, who is the data provider that is capable of providing routing data associated with the phone number, how to access the routing data if the data provider capable of providing the routing data is internal, how to access the routing data if data provider capable of providing the routing data is external, or the like. On the other hand, not all access point 22-1, 22-2, ..., 22-n may perform all the functionalities depends on the content of query 13 and/or query 15. Not all access point 22-1, 22-2, ..., 22-n may have the necessary information to retrieve routing data from data providers external to data provider 100-1 network, and they may only have limited information to retrieve routing data internally within in the data provider 100-1 network. By way of example as illustrated in FIG. 1B, data store 24-1 may have routing data associated with part or all of phone numbers of Region 3 country, and data store 24-1 is associated with access point 22-3. While access point 22-1 may not have direct access to data store 24-1, access point 22-1 knows that accessing data store 24-1 is possible through access point 22-3. When service provider 150-1 is requesting routing data associated with a phone number of Region 3 countries, access point 22-1 may send query 15 to access point 22-3.

Similarly, access point 22-3 may also have necessary information for accessing data provider 100-2 that is external to data provider 100-1 network. While access point 22-1 do not have information of how to access data provider 100-2 external to data provider 100-1 network, access point 22-1 knows external data provider 100-2 is accessible through access point 22-3. When access point 22-1 has determined that external data provider 100-2 is capable of providing routing data as requested by service provider 150-1, access point 22-1 sends query 15 to access point 22-3. In this implementation, access point 22-1 does not need to have all the necessary information to access data provider 100-2 external to data provider 100-1 network, which reduces the storage requirement of implementing access point 22-1 and reduce the cost of implementing data provider 100-1 network.

In some aspects, Query 13 may be received by access point 22-3, in this case, access point 22-3 may obtain routing data from extern data provider 100-2 directly.

In some aspects, both query 13 and query 15 may be using the ENUM protocol. ENUM is an Internet Engineering Task Force (IETF) standard for mapping the pubic telephone number address space into the Domain Name System (DNS). Query 13 may include a phone number that is represented in reverse DNS domain format with a suffix. After data provider is identified by access point 22-1, query 15 may be generated by modifying the suffix of query 13, and the modified suffix of the second query comprises the data provider identity.

Figure 2:
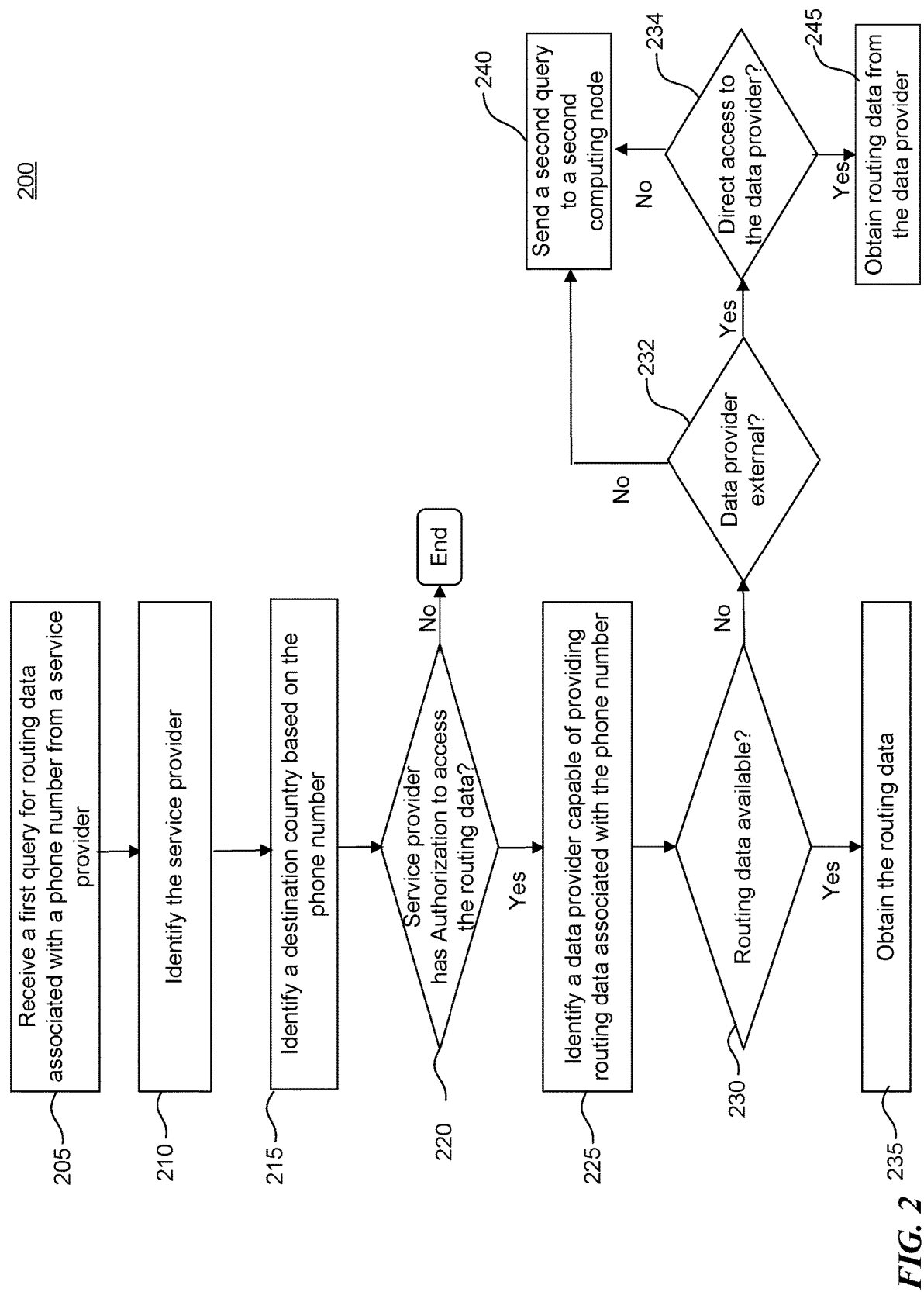
FIG. 2 illustrates an example method performed by a computing node of an example data provider implementation, according to some aspects of the disclosure.

FIG. 2 illustrates a block diagram of method 200, according to some aspects of the disclosure. For example, method 200 may be performed by a first computing node of an example data provider implementation. As a convenience and not a limitation, FIG. 2 may be described with regard to elements of FIGS. 1A and 1B.

Method 200 may represent the operation of an access point (for example, access point 22-1, 22-2, ..., 22-n of FIG. 1). Method 200 may also be performed by computer system 700 of FIG. 7. But method 200 is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 2.

According to some aspects, method 200 may be performed by a first access point (for example, access point 22-1 of FIG. 1B) of an example data provider implementation (for example, data provider 100-1 of FIG. 1).

According to some aspects, at 205, the first access point receives a first query (for example, query 13 of FIG. 1B) for routing data associated with a phone number from a service provider (for example, service provider 100-1 of FIG. 1). The first query may include the phone number.

According to some aspects, at 210, the service provider is identified. For example, the identity of the service provider may be included in the first query received at the first access point. The identity of the service provider may also be identified based on sender's addressing information.

According to some aspects, at 215, the first access point identifies a destination country of the destination phone number included in the first query. The destination country may be obtained through the country code of the phone number.

According to some aspects, at 220, the first access point makes a determination of whether the service provider has authorization to access the routing data associated with the phone number of the destination country. The first access point may have a database having records of list of countries each service provide has authorization of to access routing data associated with phone numbers of these counties. The determination may be based on the information of the database. However, the aspects of this disclosure are not limited to this example and other methods can be used for determining that the service provider has authorization. If the service provider does not have the authorization, the first access point ends the process. The first access point may return an error message to the service provider. If the service provider has the authorization of accessing routing data of the destination country, the method 200 continues at 225.

According to some aspects, at 225, the first access point identifies a data provider that is capable of providing routing data associated with the phone number. The first access point may have a database that maps individual country to each data provider who is capable of providing routing data associated with phone numbers of that country. The identification the data provider may be based on the destination country. It is also possible that the first access point may have a database that maps range of phone numbers to each data provider who is capable of providing routing data associated with the range of phone numbers. The identification of the data provider may be based on the phone number. It is to be appreciated that other methods are possible to identify the data provider. It is possible that more than one data providers may be capable of providing the requested routing data. The process of choosing one data provider among a plurality of data providers is illustrated in a block diagram in FIG. 4.

According to some aspects, at 230, the first access point makes the determination of whether the requested routing data is available to the first access point, e.g., whether there is a data store that is associated with the first access point and the data store has the request routing data. If the identified data provider is the home data provider, e.g., the data provider of which the first access point belongs to, and there is a data store associated with the first access point and the data store has the routing data, the method 200 continues at 235, and the first access point obtains the routing data directly from the data store. Subsequently, the first access point returns the routing data to the service provider. However, If the identified data provider is the home data provider but there is no data store that is associated with the first access point, it means the requested routing data is available internally within the home data provider network but not directly available to the first access point.

According to some aspects, at 232, it is determined whether the identified data provider is the home data provider. If it is determined that the identified data provider is the home data provider, the method 200 continues at 240.

According to some aspects, at 240, the first access point sends a second query to a second computing node for the routing data. The second computing node may be a second access point that is different from the first access point, and that has direct access to the routing data associated with the destination phone number, e.g., there is a data store that is associated with the second access point and the data store has the request routing data. In one implementation, the first access point may have information about routing data of all the data stores in the home data provider. Such information may be stored in a database recording the countries, and/or range of phone numbers with which each data store has the routing data associated. Based on the destination country and/or the phone number, the first access point identifies a data store that has the requested routing data, and the second access point that has direct access to the data store. The first access point then sends a second query to the second access point (for example, access point 22-3 in FIG. 1). It is to be appreciated that other implementation of the database is possible for the access point to identify the second computing node for the routing data. Subsequently, the first access point obtains the routing data from the second access point and returns the routing data to the service provider.

According to some aspects, at 225, the identified data provider can be a data provider that is different from the home data provider, e.g., the identified data provider is external to the home data provider network.

According to some aspects, at 230, the first access point determines that the routing data is not available.

According to some aspects, at 232, if the first access point determines that the data provider is an external data provider, and the method 200 continues at 234. Since the routing data is not available internally in the home data provider network, the first access point further makes a determination of whether it has information to access the external data provider directly, for example, accessing the external data provider through a routing table without going through another access point.

If the first access point is able to access the external data provider directly, at 245, the first access point obtains the routing data directly from the data provider.

If the first access point is not able to access the external data provider directly, the method 200 continues at 240.

According to some aspects, at 240, the first access point identifies a second computing node in the home data provider network and the second computing node has the information of how to reach the identified data provider. In one implementation, the first access point may have information about which access point is capable of accessing external data providers. Such information may be stored in a database in the first access point. The database may have records of all external data providers and corresponding access points that are capable of accessing external data providers. Based on the identity of the identified data provider, the first access point identifies the second access point and sent a second query to the second access point (for example, access point 22-3 in FIG. 1*i*). Subsequently, the first access point obtains the routing data from the second computing node and returns the routing data to the service provider.

Figure 3A:
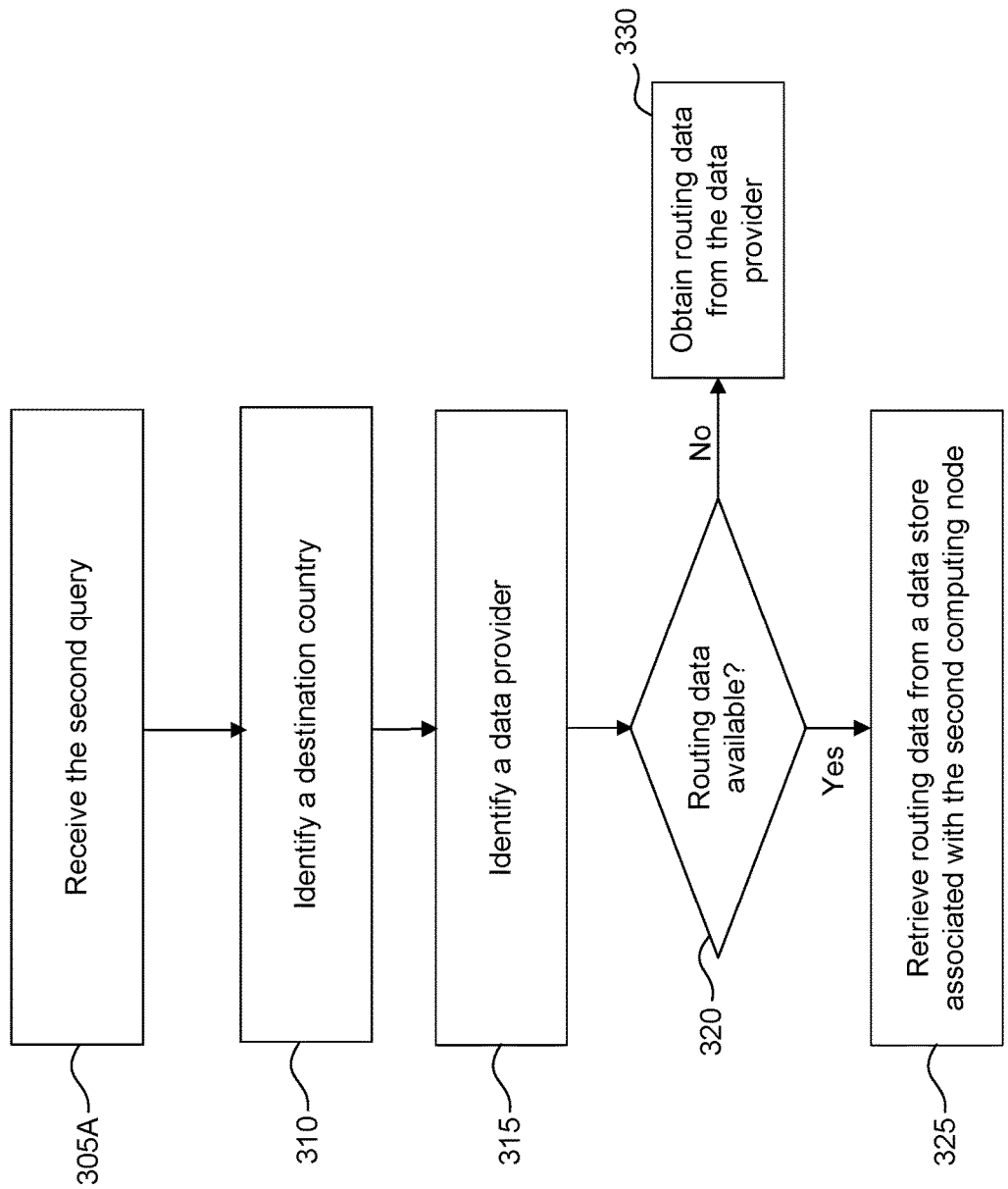
FIG. 3A illustrates an example method performed by a computing node of an example data provider implementation to provide routing data for a service provider, according to some aspects of the disclosure.
Figure 3B:
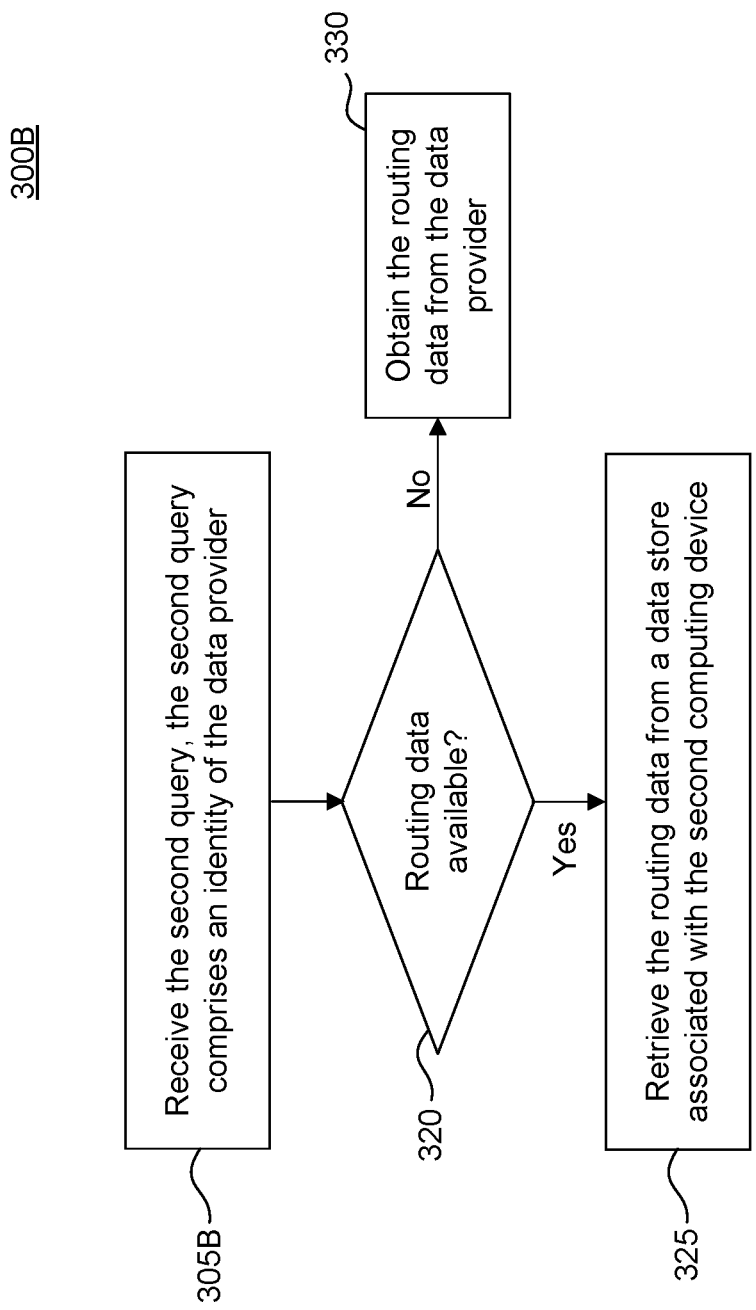
FIG. 3B illustrates an example method performed by a computing node of an example data provider implementation to provide routing data for a service provider, according to some aspects of the disclosure.

FIGS. 3A and 3B illustrate example methods 300A and 300B, according to some aspects of the disclosure. In one example, methods 300A and 300B are performed by a second computing node of an example data provider implementation to provide routing data for a service provider. As a convenience and not a limitation, FIGS. 3A and 3B may be described with regard to elements of FIGS. 1-2.

Methods 300A and 300B may represent the operation of a second computing node (for example, access point 22-3 of FIG. 1). Methods 300A and 300B may also be performed by computer system 700 of FIG. 7. But methods 300A and 300B are not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIGS. 3A and 3B.

According to some aspects, methods 300A and 300B may be performed by a second access point (for example, access point 22-3 of FIG. 1B) of an example data provider implementation (for example, data provider 100-1 of FIG. 1B).

According to some aspects, at 305A, the second query from the first access point is received by the second access point. The second query may include the destination phone number. The second access point may perform some functionalities again when receiving the second query. For example, At 310, the second access point identifies a destination country associated with the destination phone number. The destination country may be obtained through the country code of the destination phone number.

According to some aspects, at 315, the second access point identifies a data provider that is capable of providing routing data associated with the destination phone number. The second access point may have a list of countries of which each data provider is capable of providing routing data. And identifying the data provider may be based on the destination country. It is to be appreciated that other method is possible to identify the data provider. It is possible that more than one data providers may be able to provide requested routing data. The process of choosing one data provider among a plurality of data providers is illustrated in a block diagram in FIG. 4.

In one implementation, the second access point may not perform all the functionalities such as being performed by access point 22-1 in FIG. 1B. The second access point knows that the second query is sent from the first access point, and it is not needed for the second access point to identify service provider again. It is also not needed for the second access point to determine whether the service provider has authorization to access the routing data of the destination country.

According to some aspects, the second access point may not need to repeat the tasks performed by the first access point based on the content of the second query. For example, at 305B, the second query comprises an identity of the data provider. The second access point obtains the data provider identity and 310 and 315 of method 300A can be skipped at the second access point.

According to some aspects, at 320 of FIGS. 3A and 3B, the second access point determines whether the identified data provider is the home data provider based on the identity of the data provider, i.e., whether it is a data provider that the second access point belongs to. If it is the home data provider, routing data associated with the destination phone number is available internally, for example, the routing data is stored in one of the data stores in the home data provider network. Methods 300A and 300B continue at 325 to retrieve routing data associated with the destination phone number. If a data store (for example, data store 24-1 of FIG. 1B) associated with the second access point has the routing data available, the second access point retrieves the routing data from the data store. The routing data is then returned to the service provider through the first access point. According to some aspect, the routing data may be stored in a data store associated with a third access point, and the second access point retrieves the routing data through the third access point. The second access point may send a third query to the third access point.

If the data provider is different from the home data provider, and it is external to the home data provider, methods 300A and 300B continue at 330. The second access point may obtain the routing data from the data provider. In one implementation, the second access point has routing information of how to access the external data provider (for example, data provider 100-2 in FIG. 1). The second access point sends a query (for example, query 17 in FIG. 1B) to the external data provider for routing data associated with the destination phone number. The external data provider responds back with the routing data (for example, reply 18 in FIG. 1). Subsequently, the second access point returns the routing data to the service provider through the first access point. In one implementation, the second access point may not have routing information of how to access the external data provider. The second access point may send a query to a third access point who has routing information of accessing the external data provider. The second access point may obtain routing data from the external data provider through the third access point.

Figure 4:
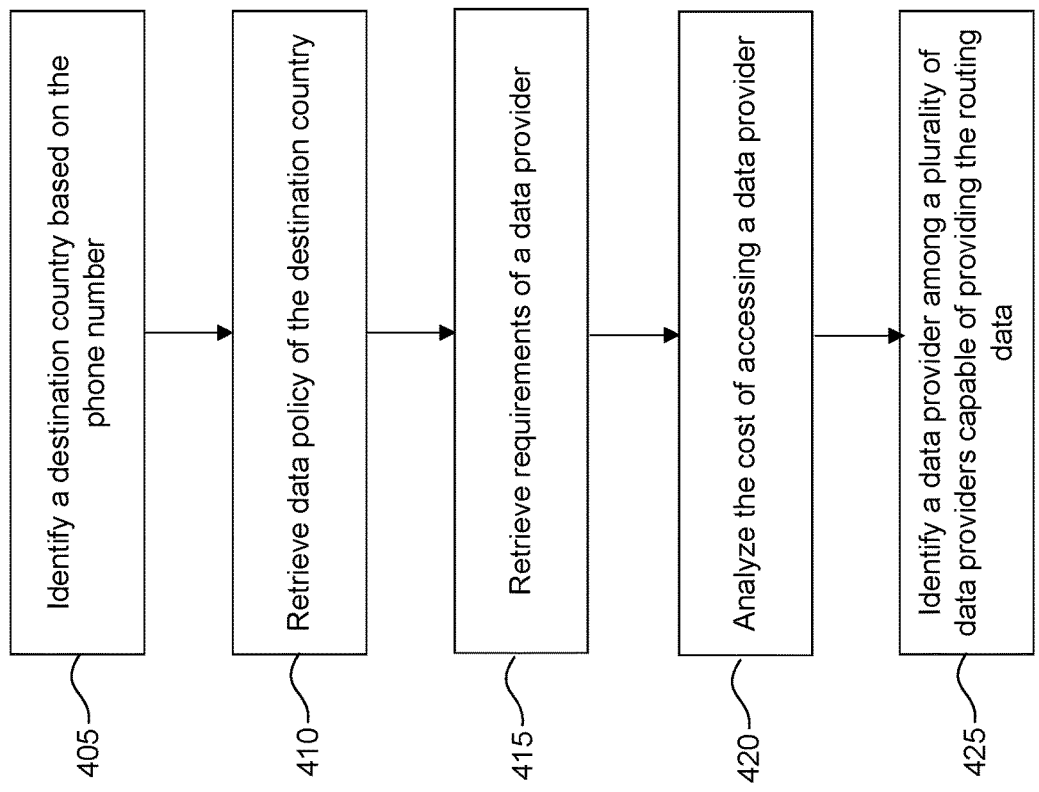
FIG. 4 illustrates an example method performed by a computing node of an example data provider implementation to identify a data provider among a plurality of data providers capable of providing the requested routing data, according to some aspects of the disclosure.

FIG. 4 illustrates a block diagram of process 400, according to some aspects of the disclosure. In one example, process 400 can be performed by a computing node of an example data provider implementation to identify a data provider among a plurality of data providers capable of providing the requested routing data. As a convenience and not a limitation, FIG. 4 may be described with regard to elements of FIGS. 1-3.

Process 400 may represent the operation of a computing node (for example, access point 22-1, 22-2, . . . , 22-n of FIG. 1). Method 400 may also be performed by computer system 700 of FIG. 7. But process 400 is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 4.

In some aspects, a set of criteria may be used to identify a data provider among a plurality of data providers that are capable of providing routing data associated with the destination phone number. The set of criteria may include data policy of the destination country. According to some aspects, at 405, a computing node (for example, access point 22-1 or 22-3 in FIG. 1B) identifies a destination country based on the phone number. According to some aspects, at 410, data policy of the destination country is retrieved. The data policy of the destination country may not allow routing data associated with phone numbers of the country to be stored and accessed outside of the country. In this case, only data provider that have access point and data store located in the country is allowed to store the routing data and provide access to the routing data.

In some aspects, the set of criteria may include analyzing requirements of a data provider. According to some aspects, at 415, the requirements of a data provider is retrieved. A data provider may impose data use requirements that may or may not be compatible with service provider's intended use. For example, a data provider may have certain limitation of how the data can be used. If such limitation is incompatible with service provider's intended use, this data provider will not be selected.

In some aspects, the set of criteria may include the cost of accessing a data provider. According to some aspects, at 420, the cost of accessing a data provider is analyzed. Different data providers may charge different fees of using their data. Such information may be available to the computing node and the information is used as one of the criteria for choosing a data provider.

According to some aspects, at 425, a data provider capable of providing the routing data is identified among a plurality of data providers based on a set of criteria. Other criteria not illustrated in FIG. 4 may also be used. Such as, for example, the latency of accessing a data provider, or the underline network condition to a data provider. It is to be appreciated that the criteria of choosing a data provider discussed here are not exclusive, other criteria may be used in combination or in additional to the criteria described here. The data provider identified may be the home data provider that the computing node belongs to. In this case, the request routing data can be obtained internally in the home data provider. On the other hand, if the data provider identified is different from the home data provider, requests of accessing the routing data from the data provider external the home data provider can be sent by one of the accessing points of the home data provider.

Figure 5:
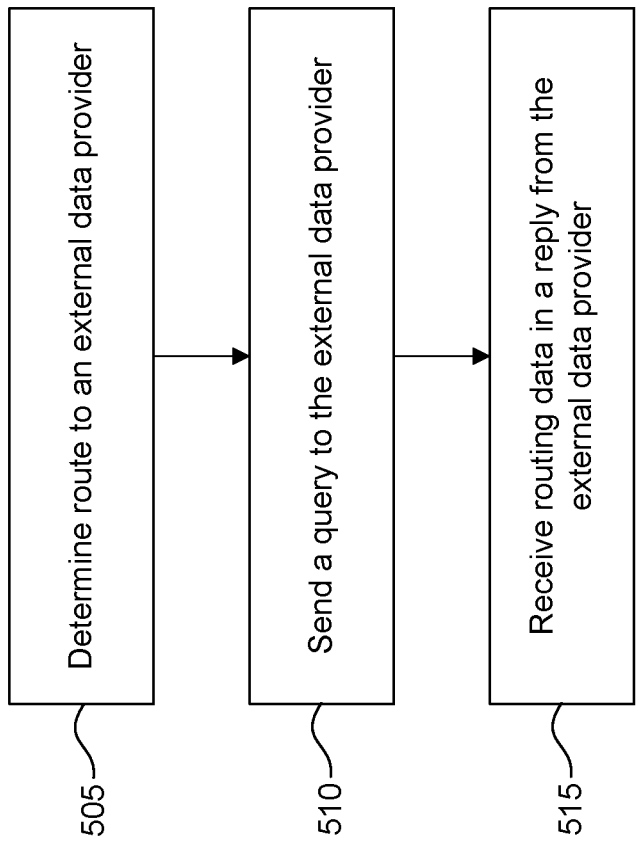
FIG. 5 illustrates an example method performed by a computing node of an example data provider implementation to obtain routing data from an external data provider, according to some aspects of the disclosure.

FIG. 5 illustrates an example method 500, according to some aspects of the disclosure. In one example, method 500 can be performed by a computing node of an example data provider implementation to obtain routing data from an external data provider. As a convenience and not a limitation, FIG. 5 may be described with regard to elements of FIGS. 1-4. Process 500 may represent the operation of a computing node (for example, access point 22-3 of FIG. 1). Method 500 may also be performed by computer system 700 of FIG. 7. But process 500 is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 5.

In some aspect, it is determined that routing data associated with the destination phone number is available at an external data provider (for example, data provider 100-2 of FIG. 1). Accessing the external data provider is possible through a subset of computing nodes of the home data provider (for example, data provider 100-1 of FIG. 1*i*). Method 500 may be performed by an access point (for example, access point 22-3 of FIG. 1*i*). Not all access points may have the information of how to access the external data provider. For an access point that has the routing information of accessing the external data provider, the method 500 starts at 505. The access point determines a desired route to the external data provider. The desired route may be the shortest route to the external data provider. The desired route may also be the route with the lowest latency. It is to be appreciated that other criteria may be used to select a desired route. According to some aspects, at 510, the access point send a query to the external data provider (for example, query 17 of FIG. 1). According to some aspects, at 515, routing data associated with the destination phone number may be obtained from the external data provider through a reply (for example, reply 18 of FIG. 1B).

FIG. 6A illustrates an example of a first query and a second query based on ENUM protocol, according to some aspects of the disclosure. As a convenience and not a limitation, FIG. 6A may be described with regard to elements of FIGS. 1-5. In some aspects, a query sent from a service provider to access points (for example, query 11 and query 13 of FIG. 1B), and between access points of a data provider (for example, query 15) may use the ENUM protocol. ENUM is an IETF standard for mapping the pubic telephone number address space into the Domain Name System (DNS). A phone number usually is an 11-digital sequences and follows the pattern such as: 1 978 555 1212. The phone number starts with a country code, followed by an area code and a 7-digital number. The phone number can be specified by standards defining how telecommunication networks operate and interwork. For example, phone number can be specified by telecommunication standard numbering. For example, these phone numbers can be specified by the International Telecommunications Union (ITU) in Recommendation E.164. The telephone number mapping such as EMUN specifics how to use DNS to locate services associated with E.164 addresses. Each phone number's DNS name is generated by reversing the sequence of the 11-digit number and separate each digit by a dot. For example, in FIG. 6A, the phone number 19785551212 turns to 2.1.2.1.5.5.5.8.7.9. The digits are then appended by .e164.arpa to get the name of the phone number that is used to query DNS: 2.1.2.1.5.5.5.8.7.9.e164.arpa. In one implementation, query 15 of FIG. 1B also follows the ENUM protocol and is a modified version of query 13 of FIG. 1B.

For example, in FIG. 1B, when a service provider 150-1 sends a query 13 for routing data associated with a destination phone number to a data provider 100-1, the query 13 may be using the ENUM protocol to represent the destination phone number. Since ENUM is a standard protocol, access points of data provider 100-1 of FIG. 1B may perform standard procedures to interpret the query based on the ENUM standard. When the access point identifies a data provider for the routing data associated with the destination phone number, the identity of the data provider may be embedded in a modified query as illustrated in FIG. 6A. For example, a second query may be created by replacing the suffix ".e164.arpa" of the first query with the identity of the data provider. This way, the computing node that receives the second query can readily identify the identity of the data provider.

FIG. 6B illustrates an example method 601, according to some aspects of the disclosure. Method 601 can be performed by a first computing node generating a second query based on a first query. As a convenience and not a limitation, FIG. 6B may be described with regard to elements of FIGS. 1-6A. Method 601 may represent the operation of an access point (for example, access point 22-1, 22-2, . . . , 22-n of FIG. 1). Method 601 may also be performed by computer system 700 of FIG. 7. But method 601 is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 6B.

According to some aspects, method 601 may be performed by a first access point (for example, access point 22-1 of FIG. 1B) of an example data provider implementation (for example, data provider 100-1 of FIG. 1). According to some aspects, at 605, the first access point receives a first query (for example, query 13 of FIG. 1B) for routing data associated with a phone number from a service provider (for example, service provider 100-1 of FIG. 1*i*). The first query include a destination phone number. The first query is based on the ENUM protocol (for example, as described in FIG. 6A). According to some aspects, at 610, the first access point may execute a set of access point functionalities. For example, the access point may identify the identity of the service provider, destination country that routing data is being requested based on the destination phone number, whether service provider is authorized for accessing the routing data of the destination country, the identity of a data provider capable of providing routing data associated with the destination phone number, etc. Once the identity of the data provider capable of providing the routing data is identified, the first access point needs to further determine whether data is available internally or externally, and how to access the data.

Method 610 continues to 615, the first access point may make a determination of whether it needs to send a second query to a second access point, according to some aspects. Such a determination may be based on the method 200 described in FIG. 2. In some aspects, the first access point determines that the identified data provider is the home data provider, therefore, the routing data associated with the destination phone number is available in one of the data stores internally, but the first access point may not be able to access the data store directly. The first access point further determines that the data store is available to a second access point of the home data provider and a second query to the second access point is needed. In some aspects, the first access point determines that the identified data provider is an external data provider and the first access point does not have the information to access the external data provider directly. The first access point further determines that a second access point has the necessary routing information to access the external data provider directly and a second query to the second access point is needed.

According to some aspects, at 620, the first access point may generate the second query and the second query includes the data provider identity. The second query can also be based on ENUM protocol and it is generated by replacing the suffix ".e164.arpa" of the first query with the identity of the data provider (for example, as shown in FIG. 6A). Subsequently, at 625, the first access point sends the second query to the second access point.

FIG. 6C illustrates an example method 640, according to some aspects of the disclosure. Method 640 can be performed by a second computing node after receiving the second query. As a convenience and not a limitation, FIG. 6C may be described with regard to elements of FIGS. 1-6B. Method 640 may represent the operation of a second computing node (for example, access point 22-3 of FIG. 1). Method 640 may also be performed by computer system 700 of FIG. 7. But method 640 is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 6C.

According to some aspects, method 640 may be performed by a second access point (for example, access point 22-3 of FIG. 1B) of an example data provider implementation (for example, data provider 100-1 of FIG. 1). According to some aspects, at 645, the second access point may receive the second query from the first access point. According to some aspects, at 650, the second access point may ascertain the identity of the data provider based on the second query. For example, the second query is in the ENUM protocol form and the identity of the data provider is readily ascertainable through reading the suffix of the query. Method 640 continues at 655. According to some aspects, at 655, based on the identity of the data provider, the second access point may determine whether the data provider is the home data provider. If it is the home data provider, routing data associated with the destination phone number is available internally, for example, the routing data is stored in one of the data stores in the home data provider network. According to some aspects, at 660, the second access point may retrieve routing data associated with the destination phone number. For example, if a data store (for example, data store 24-1 of FIG. 1B) associated with the second access point has the routing data available, the second access point retrieves the routing data from the data store. The routing data is then returned to the service provider through the first access point. According to some aspects, the routing data may be stored in a data store associated with a third access point, then the second access point retrieves the routing data through the third access point.

If the data provider is different from the home data provider, and it is external to the home data provider, method 640 continues at 665.

At 665, the second access point may obtain the routing data from the data provider. In one implementation, the second access point has routing information of how to access the external data provider (for example, data provider 100-2 in FIG. 1). The second access point sends a query (for example, query 15 in FIG. 1B) to the external data provider for routing data associated with the destination phone number. The external data provider responds back with the routing data (for example, reply 18 in FIG. 1). Subsequently, the second access point returns the routing data to the service provider through the first access point Various aspects can be implemented, for example, using one or more computer systems, such as computer system 700 shown in FIG. 7. Computer system 700 can be any well-known computer capable of performing the functions described herein such as computer servers 16-1, 16-2, ..., 16-M of FIG. 1A, service providers 150-1 ... 150-N of FIG. 1A, and/or access point 22, data store 24 of FIG. 1B. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

According to some aspects, secondary memory 710 may include other means, devices, components, instrumentalities, or other approaches for allowing computer programs and/or other instructions and/or data to be accessed by computer system 700. Such means, devices, components, instrumentalities, or other approaches may include, for example, a removable storage unit 722 and an interface 720.

Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Figure 7:
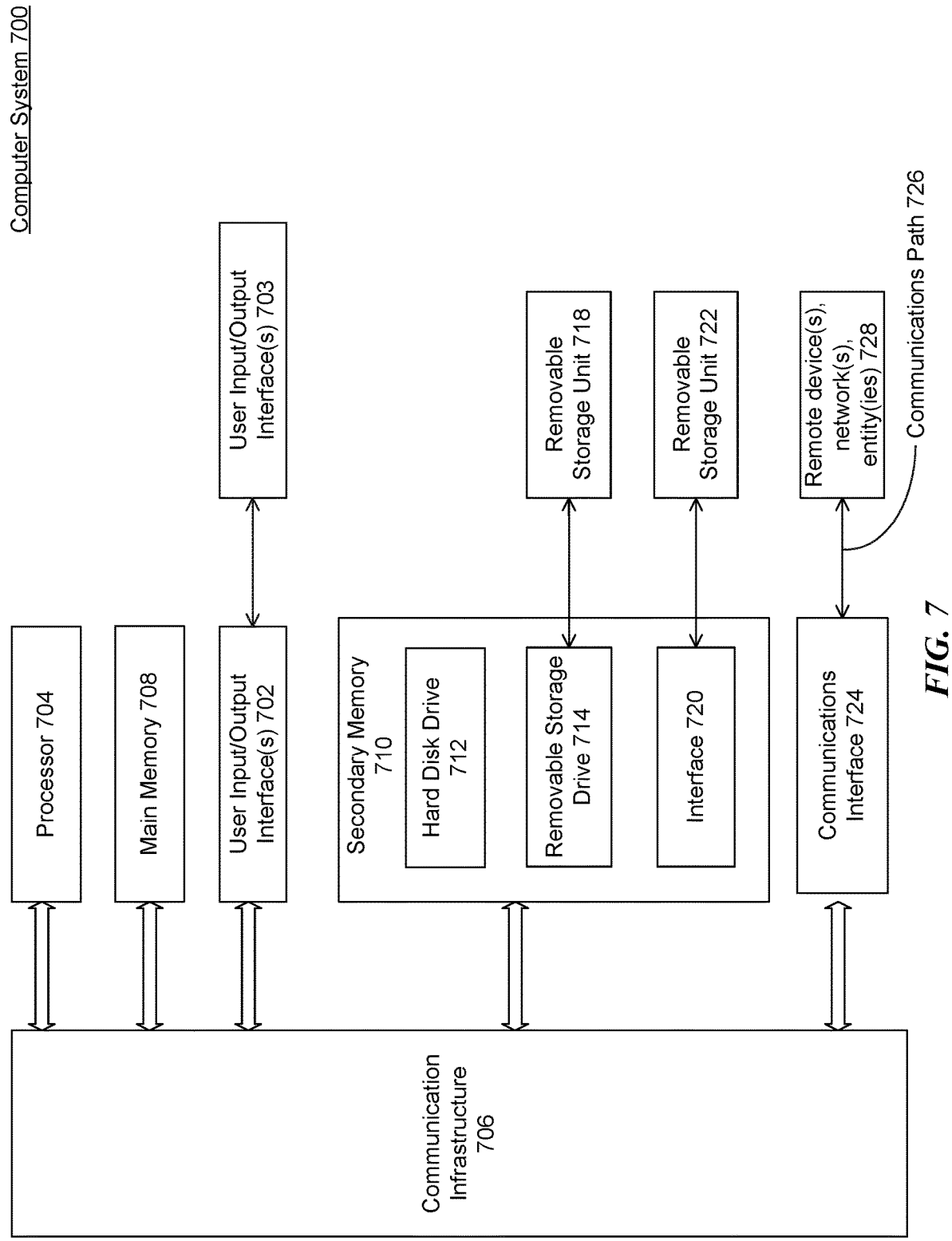
FIG. 7 illustrates an example computer system that can implement some aspects of the disclosure or portion(s) thereof.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A computer-implemented method comprising:
receiving, by a first computing node, a first query for routing data associated with a phone number from a service provider, the first query comprising the phone number;
identifying a data provider capable of providing the routing data associated with the phone number;
determining whether the routing data associated with the phone number is available to the first computing node;
sending a second query from the first computer node to a second computing node in response to a determination that the routing data associated with the phone number is not available to the first computing node, wherein the second query comprises the phone number; and
obtaining the routing data associated with the phone number.

2. The computer-implemented method of claim 1, further comprising:
identifying a destination country based on the phone number; and
determining whether the service provider has authorization to access the routing data associated with the phone number based on the destination country.

3. The computer-implemented method of claim 1, wherein the second query comprises an identity of the data provider.

4. The computer-implemented method of claim 1, wherein the obtaining the routing data associated with the phone number comprises:
retrieving the routing data associated with the phone number from a data store associated with the second computing node.

5. The computer-implemented method of claim 1, wherein the obtaining the routing data associated with the phone number comprises:
receiving the routing data associated with the phone number from the data provider external to the second computing node.

6. The computer-implemented method of claim 1, wherein:
the first query and the second query use E.164 number to Uniform Resource Identifier (URI) Mapping (ENUM) standard protocol, and
the second query is a modified version of the first query.

7. The computer-implemented method of claim 1, wherein the identifying the data provider for routing data associated with the phone number comprises choosing the data provider among a plurality of data providers capable of providing the routing data associated with the phone number.

8. The computer-implemented method of claim 7, wherein the choosing the data provider is based at least on one or more of data policy of the destination country, requirements of the data provider or cost of accessing the data provider.

9. A system comprising:
a memory; and
a processor coupled to the memory and configured to perform operations comprising:
receiving a first query for routing data associated with a phone number from a service provider, the first query comprising the phone number;
identifying a data provider capable of providing the routing data associated with the phone number;
determining whether the routing data associated with the phone number is available to a first computing node;
sending a second query to a second computing node in response to a determination that the routing data associated with the phone number is not available to the first computing node, the second query comprising the phone number; and
obtaining the routing data associated with the phone number.

10. The system of claim 9, further comprising:
one or more data stores containing routing data associated with a plurality of phone numbers.

11. The system of claim 10, wherein:
the one or more data stores comprise a first data store and a second data store,
the first data store is located at a different physical location from the second data store, and
the first data store updates data periodically from the second data store.

12. The system of claim 9, wherein the second query comprises an identity of the data provider.

13. The system of claim 9, the operations further comprising:
identifying a destination country based on the phone number; and
determining whether the service provider has authorization to access the routing data associated with the phone number from the destination country.

14. The system of claim 9, wherein:
the first query and the second query use E.164 number to Uniform Resource Identifier (URI) Mapping (ENUM) standard protocol, and
the second query is a modified version of the first query.

15. The system of claim 9, wherein the obtaining the routing data associated with the phone number comprises:
receiving the routing data associated with the phone number from the data provider external to the system.

16. The system of claim 9, wherein the identifying the data provider capable of providing the routing data associated with the phone number comprises choosing the data provider among a plurality of data providers capable of providing the routing data associated with the phone number.

17. The system of claim 16, wherein the choosing the data provider is based at least on one or more of data policy of a destination country, requirements of the data provider, or cost of accessing the data provider.

18. A non-transitory computer-readable medium having instructions stored thereon that, when executed by at least one processor, cause the at least one processor to perform operations comprising:
receiving a first query for routing data associated with a phone number from a service provider, the first query comprising the phone number;
identifying a data provider capable of providing the routing data associated with the phone number;
determining whether the routing data associated with the phone number is available to a first computing node;
sending a second query to a second computing node in response to a determination that the routing data associated with the phone number is not available to the first computing node, the second query comprising the phone number; and
obtaining the routing data associated with the phone number based on an identity of the data provider.

19. The non-transitory computer-readable medium of claim 18, wherein the operations further comprise:
identifying a destination country based on the phone number; and
determining whether the service provider has authorization to access the routing data associated with the phone number from the destination country.

20. The non-transitory computer-readable medium of claim 18, wherein:
the first query and the second query use E.164 number to Uniform Resource Identifier (URI) Mapping (ENUM) standard protocol, and
the second query is a modified version of the first query.

21. A computer-implemented method comprising:
receiving, by a first computing node, a first query for routing data associated with a phone number from a service provider, the first query comprising the phone number and using a telecommunication number mapping protocol;
identifying a data provider capable of providing the routing data associated with the phone number;
determining whether the routing data associated with the phone number is available to the first computing node;
in response to a determination that the routing data associated with the phone number is not available to the first computing node, generating a second query based on the first query by modifying a query suffix of the first query to include an identity of the data provider;
sending the second query from the first computer node to a second computing node; and
obtaining the routing data associated with the phone number.

* * * * *